US012625632B2

(12) United States Patent
Frid et al.

(10) Patent No.: US 12,625,632 B2
(45) Date of Patent: May 12, 2026

(54) DATA RETENTION FOR EFFICIENT CONSOLIDATION PROCESSING IN NVM

(71) Applicant: Sandisk Technologies, Inc., Milpitas, CA (US)

(72) Inventors: Marina Frid, Jerusalem (IL); Vered Kelner, Gan Haim (IL); Igor Genshaft, Bat Yam (IL)

(73) Assignee: Sandisk Technologies, Inc., Milpitas, CA (US)

( * ) Notice: Subject to any disclaimer, the term of this patent is extended or adjusted under 35 U.S.C. 154(b) by 89 days.

(21) Appl. No.: 18/629,039

(22) Filed: Apr. 8, 2024

(65) Prior Publication Data

US 2025/0315179 A1 Oct. 9, 2025

(51) Int. Cl.
*G06F 3/06* (2006.01)
*G06F 12/08* (2016.01)

(52) U.S. Cl.
CPC ............ *G06F 3/064* (2013.01); *G06F 3/0608* (2013.01); *G06F 3/0652* (2013.01); *G06F 3/0679* (2013.01)

(58) Field of Classification Search
CPC ...... G06F 3/0679; G06F 3/064; G06F 3/0608; G06F 3/0652; G06F 3/068; G06F 3/0656; G06F 2212/214; G06F 2212/2022; G06F 12/023
USPC .......................................... 711/103, 118, 113
See application file for complete search history.

(56) References Cited

U.S. PATENT DOCUMENTS

| | | | |
|---|---|---|---|
| 10,459,636 B2 | 10/2019 | Frid et al. | |
| 10,528,463 B2 | 1/2020 | Li et al. | |
| 11,199,983 B2* | 12/2021 | Frid | ........................ G06F 3/064 |
| 2007/0300008 A1 | 12/2007 | Rogers et al. | |
| 2015/0169458 A1* | 6/2015 | Purkayastha | ....... G06F 12/0886 |
| | | | 711/122 |
| 2018/0275873 A1* | 9/2018 | Frid | ........................ G06F 3/064 |
| 2021/0103476 A1* | 4/2021 | Lan | ...................... G06F 9/5077 |
| 2022/0413757 A1 | 12/2022 | Prudviraj Gunda et al. | |
| 2023/0062949 A1* | 3/2023 | Guan | .................. G06F 11/1448 |
| 2023/0280919 A1 | 9/2023 | Moshe et al. | |
| 2024/0111443 A1 | 4/2024 | Frid et al. | |

FOREIGN PATENT DOCUMENTS

CN 103902406 A 7/2014

OTHER PUBLICATIONS

International Search Report and Written Opinion for Application No. PCT/US2025/011250 dated Apr. 3, 2025.

* cited by examiner

*Primary Examiner* — Hashem Farrokh

(74) *Attorney, Agent, or Firm* — Patterson + Sheridan, LLP

(57) ABSTRACT

When performing a consolidation process, entries (uRuns) in the update region (uRegion) of an update layer (uLayer) are typically erased immediately after the data in the uRuns is updated to a master layer (mLayer). The data may, at a later time, be copied back to the uRuns for read purposes. Rather than erasing the uRuns and then copying the data back to the uRuns for read purposes, the uRuns can simply not be erased after the consolidation. If space is needed, the uRuns can be erased without any need for consolidation. Furthermore, if another consolidation process occurs, the uRuns that were previously consolidated, but not erased, can simply be erased.

20 Claims, 8 Drawing Sheets

Headers

| Region | | | | | | |
|---|---|---|---|---|---|---|
| Region 0 | 2 Items | 202A | 202B | | | |
| Region 1 | 4 Items | 204A | 204B | 204C | | |
| . . . | 4 Items | 206A | 206B | 206C | | |
| . . . | 5 Items | 208A | 208B | 208C | | |
| Region N-1 | 6 Items | 210A | 210B | 210C | | |

Headers

| Region | | | | | | |
|---|---|---|---|---|---|---|
| Region 0 | 2 Items | 252A | 252B | 252C | 252D | | |
| Region 1 | 4 Items | 254A | 254B | 254C | 254D | | |
| . . . | 4 Items | 256A | 256B | 256C | 256D | | |
| . . . | 5 Items | 258A | 258B | 258C | 258D | 270A | |
| Region N-1 | 6 Items | 260A | 260B | 260C | 260D | 272A | 272B |

Figure 3A:
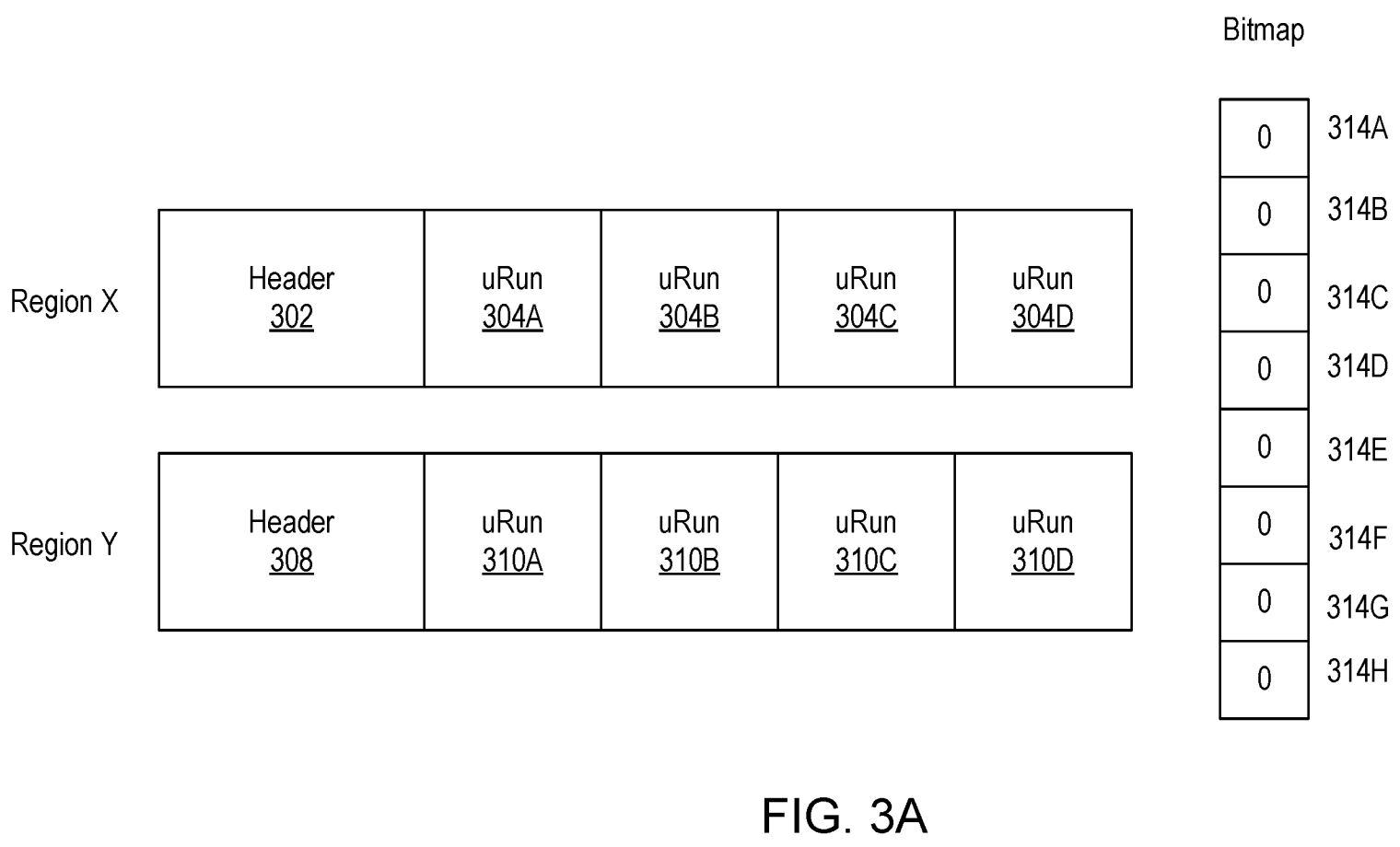

| | | | | | | | |
|---|---|---|---|---|---|---|---|
| 0 | 0 | 0 | 0 | 0 | 0 | 0 | 0 |
| 314A | 314B | 314C | 314D | 314E | 314F | 314G | 314H |

Bitmap

Region X

| Header 302 | uRun 304A | uRun 304B | uRun 304C | uRun 304D |
|---|---|---|---|---|

Region Y

| Header 308 | uRun 310A | uRun 310B | uRun 310C | uRun 310D |
|---|---|---|---|---|

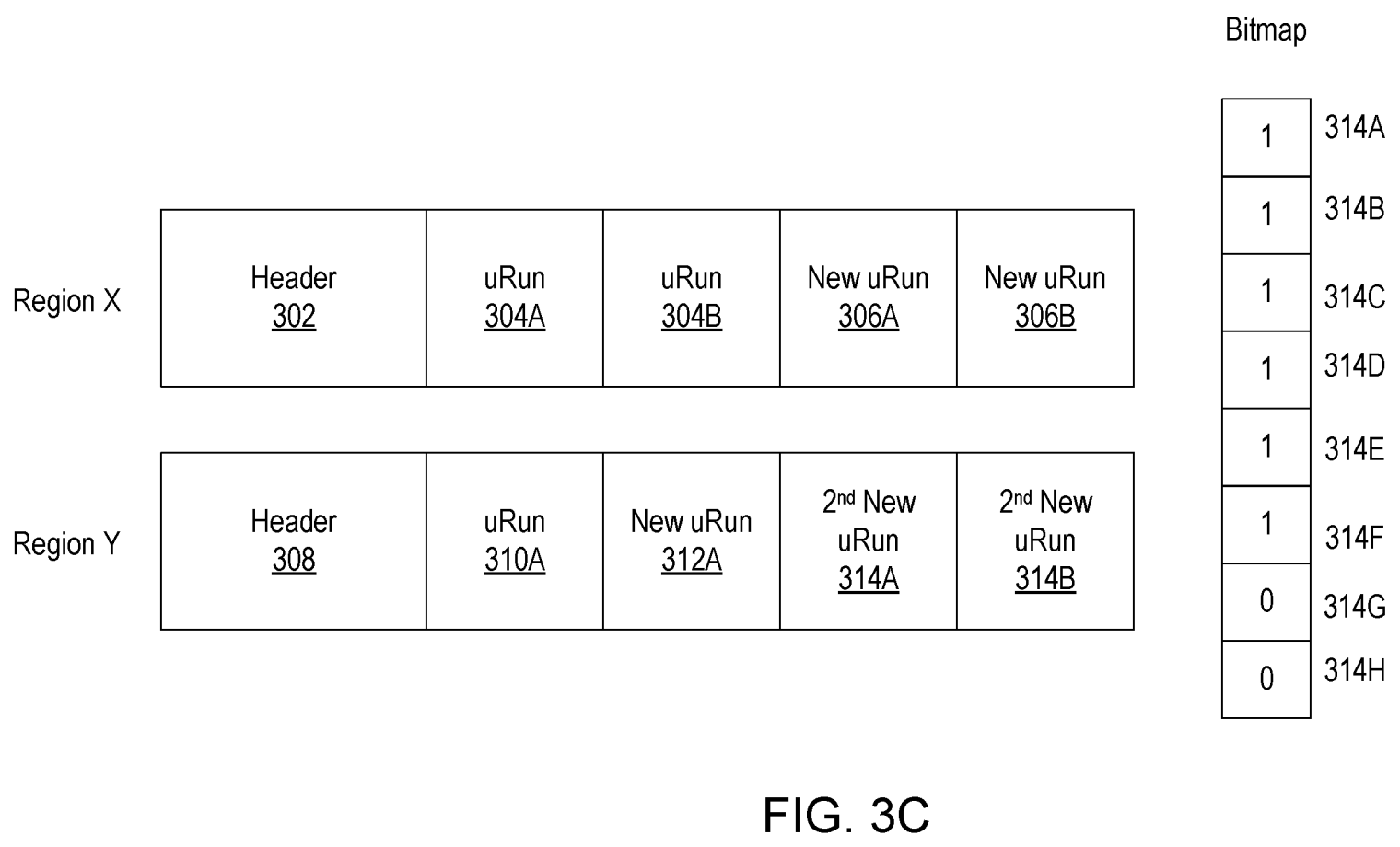

| Bitmap | |
|---|---|
| 1 | 314A |
| 1 | 314B |
| 1 | 314C |
| 1 | 314D |
| 1 | 314E |
| 1 | 314F |
| 0 | 314G |
| 0 | 314H |

Region X

| Header 302 | uRun 304A | uRun 304B | New uRun 306A | New uRun 306B |
|---|---|---|---|---|

Region Y

| Header 308 | uRun 310A | New uRun 312A | 2nd New uRun 314A | 2nd New uRun 314B |
|---|---|---|---|---|

FIG. 3C

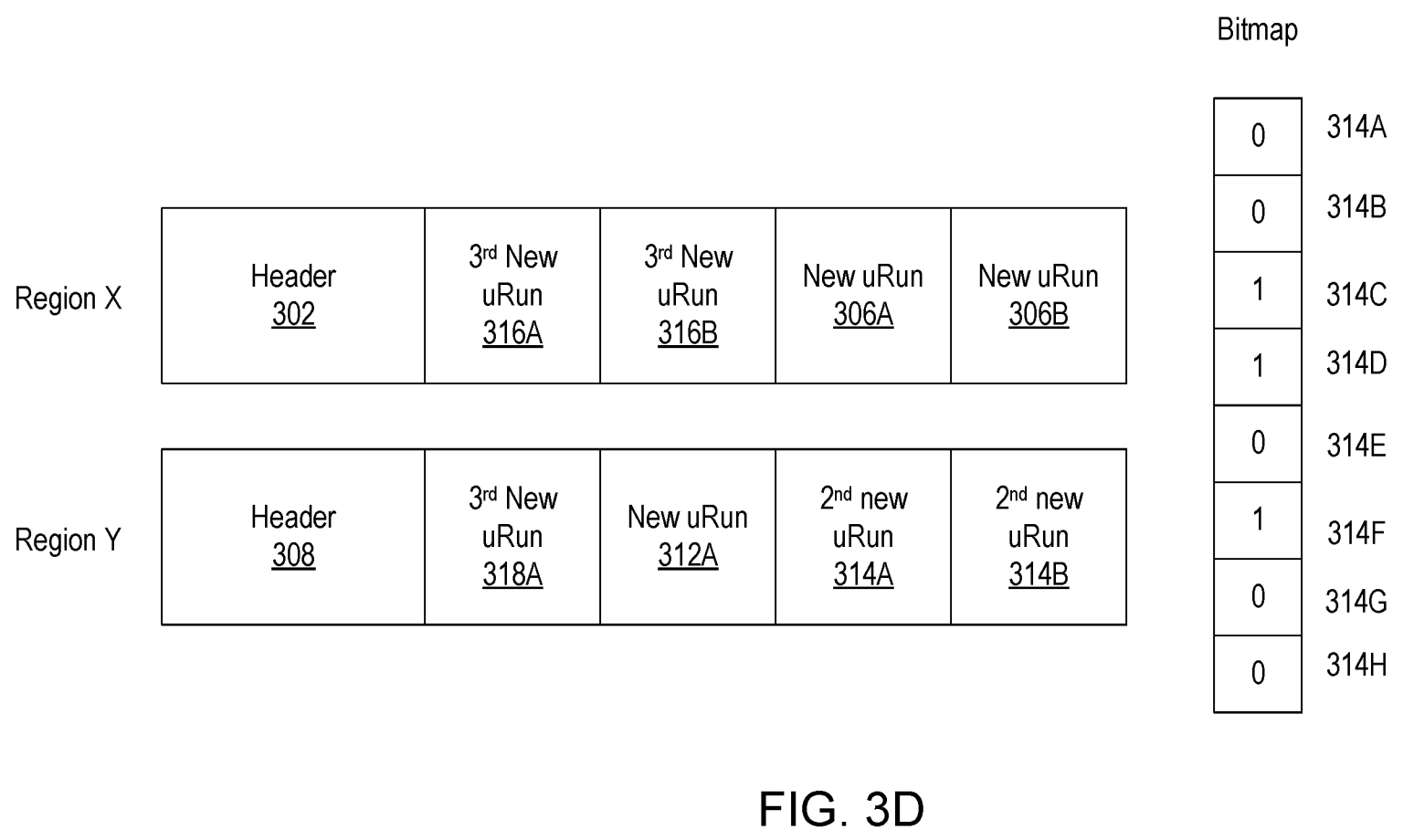

Bitmap

| | |
|---|---|
| 0 | 314A |
| 0 | 314B |
| 1 | 314C |
| 1 | 314D |
| 0 | 314E |
| 1 | 314F |
| 0 | 314G |
| 0 | 314H |

Region X

| Header 302 | 3rd New uRun 316A | 3rd New uRun 316B | New uRun 306A | New uRun 306B |
|---|---|---|---|---|

Region Y

| Header 308 | 3rd New uRun 318A | New uRun 312A | 2nd new uRun 314A | 2nd new uRun 314B |
|---|---|---|---|---|

FIG. 3D

| Bitmap | 314A | 314B | 314C | 314D | 314E | 314F | 314G | 314H |
|--------|------|------|------|------|------|------|------|------|
|        | 0    | 0    | 0    | 0    | 0    | 0    | 0    | 0    |

| Region X | Header 302 | 4th New uRun 320A | 4th New uRun 320B | 4th New uRun 320C | 4th New uRun 320D |
|----------|------------|-------------------|-------------------|-------------------|-------------------|

| Region Y | Header 308 | 4th New uRun 322A | 4th New uRun 322B | 4th New uRun 322C | 4th New uRun 322D |
|----------|------------|-------------------|-------------------|-------------------|-------------------|

FIG. 3E

DATA RETENTION FOR EFFICIENT CONSOLIDATION PROCESSING IN NVM

BACKGROUND OF THE DISCLOSURE

Field of the Disclosure

Embodiments of the present disclosure generally relate to improving read translation after sequential write operations.

Description of the Related Art

Storage devices use logical-to-physical (L2P) mapping and use management tables with control data for dynamic mapping. The management tables are stored in flash memory (e.g., NAND), but in order to provide high performance management, copies are maintained in the controller random access memory (RAM). Modern devices have dual-layered mapping architecture consisting of a Master Layer (mLayer) and an Update Layer (uLayer). The mLayer size is relatively big and the structure of the mLayer is regular (direct-access array). The uLayer size is much smaller and the structure of the uLayer is less regular. Mapping of the same logical block address (LBA) range can have a different size at different times.

The mLayer can be easily divided into equal segments (mSets), which can be saved to flash and loaded from flash (i.e., swapped out and in) when needed. Dividing the uLayer into such segments is not trivial. Low-RAM devices have a limited amount of RAM and therefore the RAM keeps a small uLayer of limited constant size regardless of the device capacity. The uLayer contains the most recent mapping in the form of ranges that allows for scanning only part, referred to as the Update Region (uRegion), of the uLayer during consolidation or translation. The purpose of the uLayer is to aggregate multiple control-updates for the same uRegion that has N mSets per uRegion, including consolidation of trapped uRegions. Each uRegion has an Update Header (uHeader) that contains the number of entries (uRun) in the uRegion and other information for the entire uRegion.

The best aggregation of multiple control updates can be reached on sequential writes or preconditions. However, aggregation can lead to a huge number of back to back consolidations when random writes occur after sequential writes.

Therefore, there is a need in the art for improved consolidation after sequential writes.

SUMMARY OF THE DISCLOSURE

When performing a consolidation process, entries (uRuns) in the update region (uRegion) of an update layer (uLayer) are typically erased immediately after the data in the uRuns is updated to a master layer (mLayer). The data may, at a later time, be copied back to the uRuns for read purposes. Rather than erasing the uRuns and then copying the data back to the uRuns for read purposes, the uRuns can simply not be erased after the consolidation. If space is needed, the uRuns can be erased without any need for consolidation. Furthermore, if another consolidation process occurs, the uRuns that were previously consolidated, but not erased, can simply be erased.

In one embodiment, a data storage device comprises: a memory device; and a controller coupled to the memory device, wherein the controller is configured to: determine that an update layer (uLayer) has reached a consolidation threshold; update a master layer (mLayer) with data from the uLayer; erase less than all data from the uLayer, wherein at least some data remains in the uLayer after the mLayer has been updated; and add additional data to the uLayer.

In another embodiment, a data storage device comprises: a memory device; and a controller coupled to the memory device, wherein the controller is configured to: track one or more uRuns of an update layer (uLayer) that remain in the uLayer after updating a master layer (mLayer), wherein the one or more uRuns of the uLayer remaining in the uLayer are sequential uRuns, wherein the one or more uRuns are tracked in a bitmap with one bit of the bitmap delegated to each uRun of the one or more uRuns; and read data from the one or more uRuns after performing a consolidation process.

In another embodiment, a data storage device comprises: means to store data; and a controller coupled to the means to store data, wherein the controller is configured to: perform a consolidation process of data stored in an update layer (uLayer), wherein the consolidation process comprises updating a master layer (mLayer) with data from the uLayer; and maintain at least some data in the uLayer that was used to update the mLayer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A shows several regions with uRuns prior to consolidation.

FIG. 3B shows the same regions of FIG. 3A after consolidation. FIG. 3C shows the same regions of FIG. 3B after a second consolidation process. FIG. 3D shows the same regions of FIG. 3C after some uRuns have been erased. FIG. 3E shows the same regions of FIG. 3D after another consolidation process.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

When performing a consolidation process, entries (uRuns) in the update region (uRegion) of an update layer (uLayer) are typically erased immediately after the data in the uRuns is updated to a master layer (mLayer). The data may, at a later time, be copied back to the uRuns for read purposes. Rather than erasing the uRuns and then copying the data back to the uRuns for read purposes, the uRuns can simply not be erased after the consolidation. If space is needed, the uRuns can be erased without any need for consolidation. Furthermore, if another consolidation process occurs, the uRuns that were previously consolidated, but not erased, can simply be erased.

Figure 1:
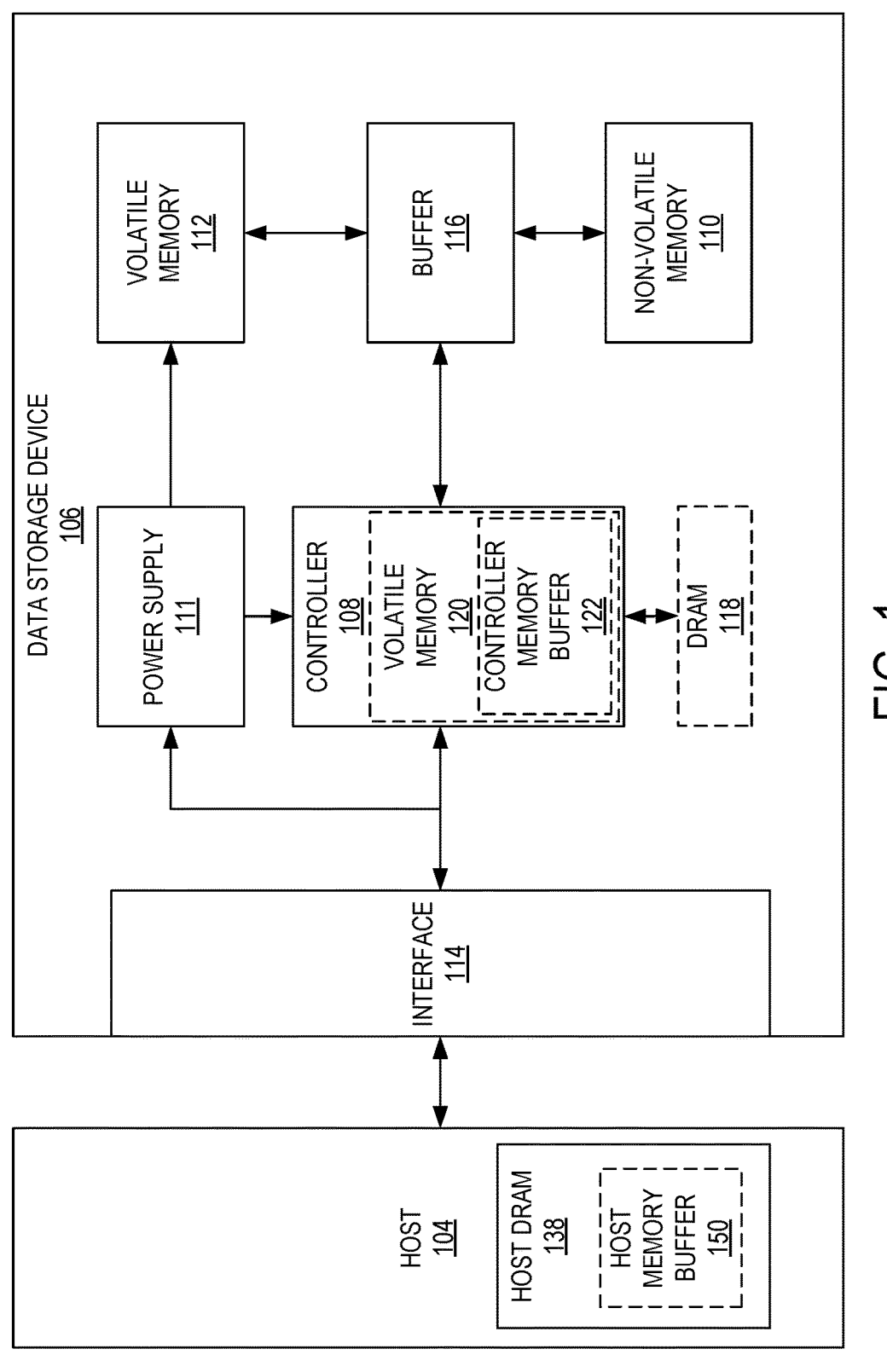
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Keeping all uRuns of a large range of sequential writes in the uLayer would be beneficial because such would significantly improve read performance after sequential write operations. However, read-write benchmarks and stress tests might be negatively affected when the total flash memory units (FMU) threshold of consolidation is significantly increased for keeping all sequential ranges that can cause timeouts because of the huge number of back to back (B2B) consolidations of trapped uRegions/mSets in the uLayer on ungraceful shutdowns (UGSDs).

As discussed herein, a delayed copy back procedure allows the possibility of keeping a large sequential workload in the uLayer for fast read translation after sequential write (SW) operations, but at the same time prevents a huge number of B2B consolidations after SW.

Recognizing trapped uRegions/mSets after sequential test/precondition (i.e., ones remaining in uLayer after the host workload had moved out of them) is not easy. A relatively small threshold of total FMUs for forced consolidation to ensure that a huge number of B2B consolidations are avoided and without a concern for a huge number of B2B consolidations is possible, but not preferred. As noted above, the uLayer contains a relatively small LBA-range of mapping which might be translated from uLayer in RAM.

Large sequential workloads may be kept in the uLayer for fast read translation after B2B consolidation and SW using a novel delayed copy back scheme. Stated another way, rather than copying back the data to the uLayer, the some specific data is simply left in the uLayer after consolidation.

Consolidation can be triggered on reaching a total FMUs consolidation threshold. For example, when the total amount of FMUs is greater than or equal to the saturated consolidation total FMU threshold, consolidation occurs, but the total amount of FMUs to reach the threshold is relatively small.

However, if sequential uRuns during copy back, which occurs during consolidation, is marked as delayed, accumulation of sequential mapping might continue remaining in uLayer until a consolidation "no Items" trigger occurs. Such allows to keep wide-range sequential mapping in the uLayer (RAM) and translating the mapping for read operations after SW or for read/write tests.

There are multiple thresholds/possibilities for initiating consolidations. One possibility is that there is not enough free space in the uLayer and therefore, consolidation needs to occur. Another possibility is when a counter, which counts the total number of FMUs, reaches a predetermined threshold. Still another possibility is that a predetermined timer has expired due to a long time between consolidations. It is contemplated that other thresholds/possibilities for instituting consolidation are possible, and the disclosure is not limited to the consolidation possibilities discussed herein.

Figure 2A:
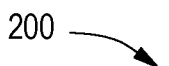
FIG. 2A is a schematic illustration of uRuns in a uLayer prior to consolidation.

FIG. 2A is a schematic illustration 200 of uRuns in a uLayer prior to consolidation. As shown in FIG. 2A, there are numerous regions, specifically Regions 0-N-1. Each region has a header. For Region 0, it is shown that there are 2 items in the header. Region 1 has 4 items in the header. Region 2 also has 4 items in the header. Region 3 has 5 items in the header, and Region N-1 has 6 items in the header. There are two uRuns (202A, 202B) in Region 0, three uRuns (204A-204C) in Region 1, three uRuns (206A-206C) in Region 2, three uRuns (208A-208C) in Region 3, and three uRuns (210A-210C) in Region N-1. One consolidation possibility, as noted above, is where the total FMUs is equal to or greater than the saturated consolidation FMU threshold. In FIG. 2A, if the total FMUs has reached the threshold, then consolidation would be performed. In traditional consolidation, all of the uRuns would be consolidated to the mLayer and erased. Then, if there is to be any reading of data from the uRuns, the data is copied back to the uRuns at a later time.

Figure 2B:
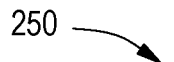
FIG. 2B is a schematic illustration of uRuns in a uLayer after consolidation according to one embodiment.

FIG. 2B is a schematic illustration 250 of uRuns in a uLayer after consolidation according to one embodiment. Similar to FIG. 2A, there are numerous regions, specifically Regions 0-N-1. Each region has a header. For Region 0, it is shown that there are 2 items in the header. Region 1 has 4 items in the header. Region 2 also has 4 items in the header. Region 3 has 5 items in the header, and Region N-1 has 6 items in the header. However, in FIG. 2B, there are uRuns that have already been consolidated and uRuns that have not been consolidated. Regions 1-3 and N-1 all have uRuns (252A-252D, 254A-254D, 256A-256D, 258A-258D, 260A-260D) that have been consolidated. Additionally, Regions 3 and N-1 have uRuns 270A, 272A, 272B that have not been consolidated. The uRuns that have been consolidated are marked as copy back delayed. For the total FMU consolidation threshold, the consolidation will be performed if the total amount of FMUs minus the total delayed amount of FMUs is greater than or equal to the saturation consolidation total FMUs threshold which would trigger the "no items" threshold.

Generally speaking, the process of not erasing uRuns involves creating a delayed copy back bitmap bit per uRun, which can be for example ~8 KB for a uLayer that is 512 KB, and the total delayed amount of FMUs which may be 4 bytes for example, will both be saved in a log on control sync operations. It is to be understood that using a bitmap is merely one example and the disclosure is not limited to bitmaps for tracking which uRuns have been consolidated, but not yet erased. In the context of the disclosure, delayed copy back means to not remove uRuns from uLayer, but set bit per sequential uRun in the delayed copy back bitmap and increase the total delayed amount of FMUs with the uRun length. The algorithm below will be used upon reaching consolidation by the total FMUs trigger of the total amount of FMUs—total delayed amount of FMUs being greater than or equal to the saturation consolidation total FMUs.

The algorithm is:

If "Threshold" (=8 TBD) sequentially written mSets are in CAT, do force consolidation and flush these mSets with delayed copy back (i.e., set the mSets' bits in the bitmap and not remove the uRuns from uLayer).

Else when consolidation by "total FMUs" is triggered, select a few uRegions with max FMUs (with their mSets not necessarily in CAT) and force consolidation with delayed copy back.

Else when consolidation by "free items" is triggered for uRegion X, during consolidation of uRegion X, remove all uRuns in uRegion X that are marked in the delayed copy back bitmap (these uRuns have been already consolidated but their removal was delayed until now).

Figure 3B:
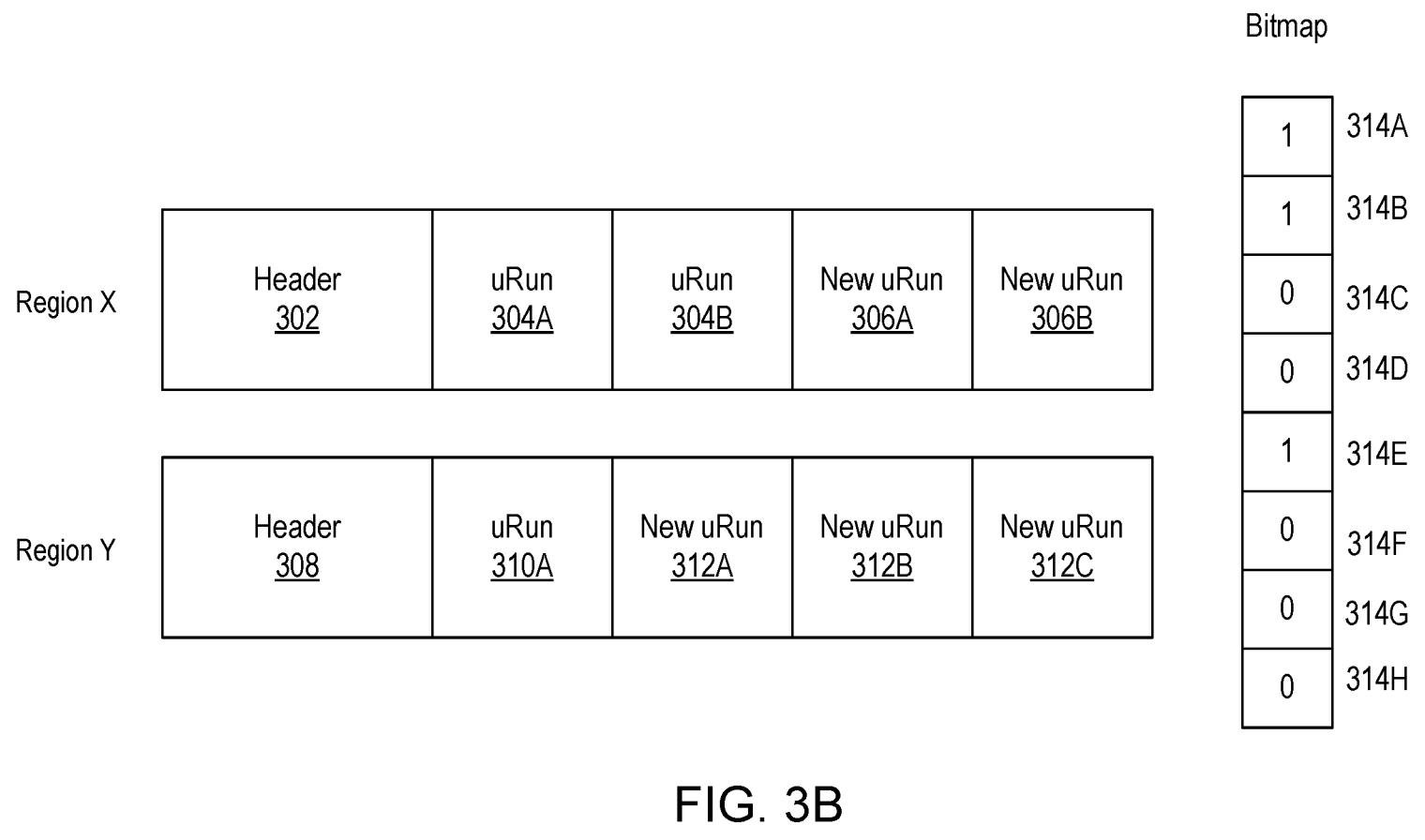

FIG. 3A shows several regions with uRuns prior to consolidation. FIG. 3B shows the same regions of FIG. 3A after consolidation. FIG. 3C shows the same regions of FIG. 3B after a second consolidation process. FIG. 3D shows the same regions of FIG. 3C after some uRuns have been erased. FIG. 3E shows the same regions of FIG. 3D after another consolidation process.

In FIG. 3A, Region X has a header 302, and data in uRuns 304A-304D. Similarly, Region Y has a header 308 with data in uRuns 310A-310D. Because consolidation has not yet occurred, the bitmap has a value of 0 for each bit of the bitmap. Each bit of the bitmap corresponds to a uRun. More specifically, bit 314A corresponds to uRun 304A, bit 314B corresponds to uRun 304B, bit 314C corresponds to uRun 304C, bit 314D corresponds to uRun 304D, bit 314E corresponds to uRun 310A, bit 314F corresponds to uRun 310B, bit 314G corresponds to uRun 310C, and bit 314H corresponds to uRun 310D.

Consolidation will then occur to merge the corresponding mSets, store the uRuns as part of the mSets in the memory device, and remove the uRuns from the uLayer. Thus, after consolidation, the mapping that was previously in the consolidated uRuns is now located in the mLayer in the memory device. The data in the uRuns can then be deleted. However, as noted above, there is an advantage to leaving at least some data in the uRuns after consolidation, but such data needs to be tracked using the bitmap, for example.

In FIG. 3B, consolidation has occurred, and the data in some of the uRuns 304A, 304B, 310A has not been erased. It is to be understood that what is shown in FIG. 3B is merely an example of data that has not been erased. FIG. 3B shows some of the data from uRuns that had data (i.e., uRuns 304A, 304B, 310A) in FIG. 3A have been consolidated and remain in FIG. 3B, while data in uRuns 304C, 304D, 310B-310D have been consolidated and erased. It is contemplated that less than all data from uRuns in FIG. 3A may remain in FIG. 3B. What is shown in FIG. 3B is merely for exemplification purposes and not to be limiting of the disclosure. Region X has uRuns 304A, 304B with data that has been consolidated but not erased, and new uRuns 306A, 306B have new data that has not been consolidated. Similarly, Region Y has data in uRun 310A that has been consolidated but not erased, and data in uRuns 312A-312C that has not been consolidated. The bitmap has been updated to reflect data in uRuns 304A, 304B, 310A that has not been erased, but has been consolidated. A value of 1 is in place for the bits corresponds to uRuns 304A, 304B, 310A that have data that has been consolidated but not erased. More specifically, bits 314A, 314B, 314E have been updated to a value of 1 while the remaining bits remain at 0. Data from uRuns 304C, 304D, 310B-310D has been consolidated and erased.

In FIG. 3C, more data has been added to the uLayer and a second consolidation has occurred. In the second consolidation, data from new uRuns 306A-306B and 312A-312C have been consolidated while data from uRuns 304A-304B and 310A have not been re-consolidated as those uRuns were consolidated in the previous consolidation. As such, the bitmap has been updated so that bits 314C, 314D, and 314F now have a value of 1 as do bits 314A, 314B, and 314E. New uRuns 312B, 312C have been consolidated and erased. Specifically, $2^{nd}$ new uRuns 314A, 314B now have data that has not been consolidated. It is to be understood that what is shown in FIG. 3C is merely an example of data that has not been erased and data that has been added. What is shown in FIG. 3C is merely for exemplification purposes and not to be limiting of the disclosure.

In FIG. 3D, the uLayer does not have enough free space and therefore, some uRuns need to be erased without performing another consolidation. The data in uRuns 304A, 304B, 310A are simply erased, without performing another consolidation because the data in uRuns 304A, 304B, 310A has already been consolidated. Now that space is available, data is placed in $3^{rd}$ new uRuns 316A, 316B, 318A such that those uRuns have data that has not yet been consolidated. Correspondingly, the bits 314A, 314B, 314E of the bitmap are changed to 0 because there is data in the corresponding $3^{rd}$ new uRuns 316A, 316B, 318A hat has not been consolidated. Therefore, FIG. 3D exemplifies erasing uRuns 304A, 304B, 310A that have already been consolidated without performing another consolidation on those uRuns 304A, 304B, 310A. FIG. 3D also exemplifies not erasing new uRuns 306A, 306B, 312A and not erasing $2^{nd}$ new uRuns 314A, 314B. FIG. 3D also exemplifies data in $3^{rd}$ new uRuns 316A, 316B, 318A that have not yet been consolidated.

FIG. 3E exemplifies the situation where another consolidation has occurred after FIG. 3D, and all data has been erased from the uRuns and $4^{th}$ new uRuns 320A-320D, 322A-322D have data. All bits 314A-314H of the bitmap have correspondingly been marked 0. What is shown in FIG. 3E is merely an example of after consolidation with all previously saved uRuns erased. During the consolidation, data from the $2^{nd}$ New uRuns 314A, 314B and data from the $3^{rd}$ New uRuns 316A, 316B, 318A are consolidated and then erased while data from New uRuns 306A, 306B, 312A are simply erased without further consolidation as those uRuns were previously consolidated.

Figure 4:
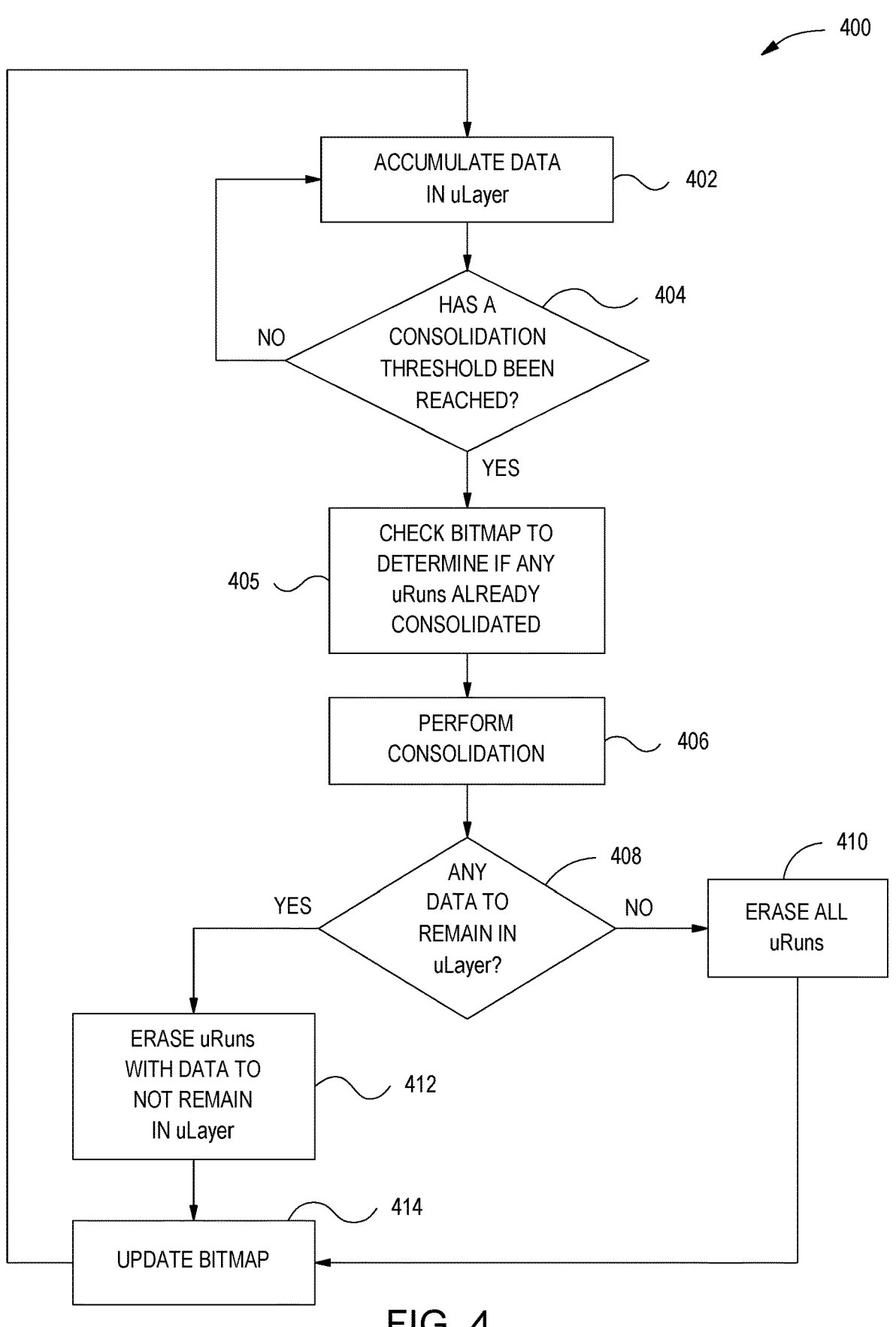
FIG. 4 is a flowchart illustrating a method of leaving data in uRuns after consolidation.

FIG. 4 is a flowchart 400 illustrating a method of leaving data in uRuns after consolidation. At block 402, data is accumulated in the uLayer. Thereafter, at block 404, a determination is made regarding whether a threshold has been achieved to necessitate a consolidation process. If the threshold has not been reached, then data continues to be accumulated at block 402. If the threshold has been reached, then a bitmap (or other container) is checked to determine whether any uRuns in the uLayer have already been consolidated at block 405. If there are uRuns that have already been consolidated, then those uRuns need not be consolidated again. After checking the bitmap (or other container) at block 405, consolidation is performed at block 406. A determination is then made regarding weather any data is to remain in the uRun for later read operations at block 408. If there is no data to remain in the uLayer, then all uRuns are erased in block 410 and the data can then start to re-accumulate in block 402 after updating the bitmap at block 414. However, if data is to be retained in the uLayer, then the uRuns with data to not remain are erased at block 412 and the data that is to remain is not erased. Thereafter, the bitmap (or other container for tracking such things) is updated to reflect which uRuns have data that was already consolidated at block 414, but still remains in uRuns. Thereafter, data can then start to re-accumulate in block 402.

By using a delayed copy back, or stated another way simply leaving uRuns in the uLayer after consolidation, reading after SW performance is greatly improved for both DRAM and DRAM-less devices. Additionally, in SW cases, the disclosure helps to decrease the number of B2B consolidations on UGSD. Furthermore, the disclosure will decrease the number of B2B consolidations and therefore reduce latency when read/write testing or deallocating comes after a SW.

In one embodiment, a data storage device comprises: a memory device; and a controller coupled to the memory device, wherein the controller is configured to: determine that an update layer (uLayer) has reached a consolidation threshold; update a master layer (mLayer) with data from the uLayer; erase less than all data from the uLayer, wherein at least some data remains in the uLayer after the mLayer has been updated; and add additional data to the uLayer. The uLayer contains both data that has been updated to the mLayer and the additional data after the adding, wherein the additional data has not be updated to the mLayer. The controller is configured to maintain a tracking mechanism to track data in the uLayer that has already been updated to the mLayer. The tracking mechanism is a bitmap. The controller is configured to erase the at least some data from the uLayer after the adding. The erasing the at least some data is in response to a determination that storage space is needed in the uLayer. The at least some data is not updated to the mLayer after the adding and before the erasing the at least some data. The controller is configured to read the at least some data from the uLayer in response to a read request received after the erasing. The at least some data is sequential data. The controller is configured to perform a consolidation after the adding, wherein during the consolidation, the at least some data is not updated to the mLayer.

In another embodiment, a data storage device comprises: a memory device; and a controller coupled to the memory device, wherein the controller is configured to: track one or more uRuns of an update layer (uLayer) that remain in the uLayer after updating a master layer (mLayer), wherein the one or more uRuns of the uLayer remaining in the uLayer are sequential uRuns, wherein the one or more uRuns are tracked in a bitmap with one bit of the bitmap delegated to each uRun of the one or more uRuns; and read data from the one or more uRuns after performing a consolidation process. The controller is configured to determine that a consolidation process needs to occur. The controller is configured to erase the one or more uRuns without re-updating the mLayer with the one or more uRuns. The controller is configured to change a corresponding bitmap bit to 0 for each of the erased one or more uRuns. The determining is due to a no free items trigger. The determining is due to a counter exceeding a threshold. The one or more uRuns are sequential.

In another embodiment, a data storage device comprises: means to store data; and a controller coupled to the means to store data, wherein the controller is configured to: perform a consolidation process of data stored in an update layer (uLayer), wherein the consolidation process comprises updating a master layer (mLayer) with data from the uLayer; and maintain at least some data in the uLayer that was used to update the mLayer. The at least some data is disposed in one or more uRuns. The one or more uRuns are tracked in a bitmap with one bit of the bitmap delegated to each uRun of the one or more uRuns.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine that an update layer (uLayer) has reached a consolidation threshold, wherein the determining is due to a no free items trigger;
update a master layer (mLayer) with data from the uLayer;
erase less than all data from the uLayer, wherein at least some data remains in the uLayer after the mLayer has been updated; and
add additional data to the uLayer.

2. The data storage device of claim 1, wherein the uLayer contains both data that has been updated to the mLayer and the additional data after the adding, wherein the additional data has not be updated to the mLayer.

3. The data storage device of claim 1, wherein the controller is configured to maintain a tracking mechanism to track data in the uLayer that has already been updated to the mLayer.

4. The data storage device of claim 3, wherein the tracking mechanism is a bitmap.

5. The data storage device of claim 1, wherein the controller is configured to erase the at least some data from the uLayer after the adding.

6. The data storage device of claim 5, wherein the erasing the at least some data is in response to a determination that storage space is needed in the uLayer.

7. The data storage device of claim 6, wherein the at least some data is not updated to the mLayer after the adding and before the erasing the at least some data.

8. The data storage device of claim 1, wherein the controller is configured to read the at least some data from the uLayer in response to a read request received after the erasing.

9. The data storage device of claim 1, wherein the at least some data is sequential data.

10. The data storage device of claim 1, wherein the controller is configured to perform a consolidation after the adding, wherein during the consolidation, the at least some data is not updated to the mLayer.

11. The data storage device of claim 1, wherein the controller is further configured to update the mLayer with a portion of the data from the uLayer prior to reaching a consolidation threshold, wherein the portion of the data remains in the uLayer.

12. A data storage device, comprising:
a memory device; and
a controller coupled to the memory device, wherein the controller is configured to:
track one or more uRuns of an update layer (uLayer) that remain in the uLayer after updating a master layer (mLayer), wherein the one or more uRuns of the uLayer remaining in the uLayer are sequential uRuns, wherein the one or more uRuns are tracked in a bitmap with one bit of the bitmap delegated to each uRun of the one or more uRuns;
determine that a consolidation process needs to occur, wherein the determining is due to a no free items trigger; and
read data from the one or more uRuns after performing a consolidation process.

13. The data storage device of claim 12, wherein the controller is configured to erase the one or more uRuns without re-updating the mLayer with the one or more uRuns.

14. The data storage device of claim 13, wherein the controller is configured to change a corresponding bitmap bit to 0 for each of the erased one or more uRuns.

15. The data storage device of claim 12, wherein the one or more uRuns are sequential.

16. The data storage device of claim 12, wherein the uLayer contains both data that has been updated to the mLayer and data that has not be updated to the mLayer.

17. A data storage device, comprising:
means to store data; and
a controller coupled to the means to store data, wherein the controller is configured to:
determine that a consolidation process of data stored in an update layer (uLayer) needs to occur, wherein the determining is due to a no free items trigger;
perform the consolidation process of data stored in the uLayer, wherein the consolidation process comprises updating a master layer (mLayer) with data from the uLayer; and
maintain at least some data in the uLayer that was used to update the mLayer.

18. The data storage device of claim 17, wherein the at least some data is disposed in one or more uRuns.

19. The data storage device of claim 18, wherein the one or more uRuns are tracked in a bitmap with one bit of the bitmap delegated to each uRun of the one or more uRuns.

20. The data storage device of claim 17, wherein the controller is configured to read the at least some data from the uLayer in response to a read request received after the erasing.

* * * * *